(12) United States Patent
Takamiya et al.

(10) Patent No.: US 7,801,667 B2
(45) Date of Patent: Sep. 21, 2010

(54) CONTROL FOR AN INTERNAL-COMBUSTION ENGINE

(75) Inventors: Hideharu Takamiya, Saitama (JP); Seiichiro Irie, Saitama (JP); Yutaka Kouda, Saitama (JP); Isao Komoriya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 12/232,097

(22) Filed: Sep. 10, 2008

(65) Prior Publication Data

US 2009/0070011 A1    Mar. 12, 2009

(30) Foreign Application Priority Data

Sep. 12, 2007    (JP) ............................. 2007-236351

(51) Int. Cl.
    B60T 7/12    (2006.01)
    G05D 1/00    (2006.01)
    G06F 7/00    (2006.01)
    G06F 17/00    (2006.01)

(52) U.S. Cl. ...................... 701/103; 701/104; 701/110; 701/115; 123/90.15; 123/344; 123/402

(58) Field of Classification Search ................ 701/102, 701/103, 108, 110, 115; 123/90.11, 90.15–90.19, 123/316, 344–348, 361, 399, 402, 403, 405
    See application file for complete search history.

(56) References Cited

U.S. PATENT DOCUMENTS 4,009,695 A * 3/1977 Ule .......................... 123/90.13
4,716,871 A * 1/1988 Sakamoto et al. ......... 123/339.22
5,714,683 A * 2/1998 Maloney .................... 73/114.33

(Continued)

FOREIGN PATENT DOCUMENTS

DE    10 2005 033 939 A1    7/2005

(Continued)

OTHER PUBLICATIONS

European Search Report, 44020P EP/PRjh, dated Feb. 3, 2009.

(Continued)

*Primary Examiner*—Stephen K Cronin
*Assistant Examiner*—Anthony L Bacon
(74) *Attorney, Agent, or Firm*—Squire, Sanders & Dempsey L.L.P.

(57) ABSTRACT

A control for an engine having a variable valve actuation mechanism is provided. A map indicating a correlation among a rotational speed, a gauge pressure of an intake manifold, a lift amount of an intake valve, a phase of the intake valve and an intake air amount of the engine under a reference condition of a predetermined reference atmospheric pressure and a predetermined reference intake air temperature is defined. An intake air amount for the reference condition is determined as a reference intake air amount by referring to the map based on a current rotational speed, a current gauge pressure, a current lift amount and a current phase. The reference intake air amount is corrected with a ratio between an air density under a current condition of a current atmospheric pressure, a current intake air temperature and a current gauge pressure and an air density under the reference condition to calculate an intake air amount for the current condition.

9 Claims, 8 Drawing Sheets

U.S. PATENT DOCUMENTS

| | | |
|---|---|---|
| 5,832,897 A | 11/1998 | Zhang |
| 6,626,144 B1 | 9/2003 | Kanamaru |
| 6,666,191 B2 * | 12/2003 | Nakagawa et al. .......... 123/480 |
| 7,347,183 B2 * | 3/2008 | Tabata et al. ................ 123/336 |
| 7,383,820 B2 * | 6/2008 | Lewis et al. ................. 123/491 |
| 2002/0046733 A1 * | 4/2002 | Kobayashi et al. .......... 123/399 |
| 2006/0064232 A1 * | 3/2006 | Ampunan et al. ........... 701/115 |
| 2006/0283414 A1 | 12/2006 | Yasui et al. |
| 2007/0088487 A1 * | 4/2007 | Lahti et al. .................. 701/104 |
| 2009/0125212 A1 * | 5/2009 | Kurashima et al. .......... 701/103 |

FOREIGN PATENT DOCUMENTS

| | | |
|---|---|---|
| EP | 0 568780 A2 | 11/1993 |
| EP | 0 845 587 A2 | 11/1997 |
| EP | 0 893 590 A2 | 7/1998 |
| EP | 1 308 604 A2 | 10/2002 |
| JP | 10-047114 | 2/1998 |
| JP | 10-073068 | 3/1998 |
| JP | 2000-080937 | 3/2000 |
| JP | 2001-073789 | 3/2001 |
| JP | 2002-180857 | 6/2002 |
| JP | 2005-120990 | 5/2005 |
| JP | 2006 029279 | 2/2006 |

OTHER PUBLICATIONS

European Search Report, EP 08 01 6018 dated Mar. 26, 2009.

* cited by examiner

CONTROL FOR AN INTERNAL-COMBUSTION ENGINE

BACKGROUND OF THE INVENTION

The present invention relates to a control for an internal-combustion engine (which will be hereinafter referred to as an "engine").

In recent engines, as described in Japanese Patent Application Publication No. 2005-120990, mounting, on an engine, a mechanism that is capable of changing a lift amount and a phase of an intake valve and controlling the amount of intake air into the engine through the mechanism are proposed On the other hand, as described in Japanese Patent Application Publication No. H10-073068, an absolute pressure of an intake manifold is generally used for controlling an engine.

The atmospheric pressure at high altitude is lower than the atmospheric pressure at low altitude. Such a lower atmospheric pressure may influence various controls for an engine. Especially, if a control that uses the absolute pressure of the intake manifold is performed at high altitude, such a control may decrease an exhaust gas pressure, internal EGR amount, and the like. As a result, variations may occur in the intake air amount, fuel injection amount, ignition timing and the like. In the engine where the mechanism as described above is mounted, various controls for the intake air amount, fuel injection amount, ignition timing and the like are performed taking the lift amount and phase into account. For an engine having such a mechanism, it is desirable that controls for the engine are performed considering whether the vehicle is at high altitude or not.

In a case where the above-described mechanism is mounted on an engine, the number of parameters to be used in various controls of the engine may increase. Further, computation load for calculating controlled variables may increase. Especially, if a mechanism that is capable of continuously changing a lift amount and a phase of an intake vale is mounted on an engine, the number of parameters and the computation load may significantly increase. Therefore, it is desirable that such increase of the number of parameters and the computation load can be suppressed in controls of the engine.

SUMMARY OF THE INVENTION

According to one aspect of the present invention, a control for an engine having a variable valve mechanism for controlling an intake air amount by adjusting a lift amount and a phase of an intake valve of the engine is provided. An intake air amount map indicating a correlation among a rotational speed, a gauge pressure of an intake manifold, a lift amount of the intake valve, a phase of the intake valve and an intake air amount of the engine under a reference condition of a predetermined reference atmospheric pressure and a predetermined reference intake air temperature is provided. The map is referred to based on a current rotational speed, a current gauge pressure of the intake manifold, a current lift amount of the intake valve and a current phase of the intake valve to determine, as a reference intake air amount, an intake air amount for the reference condition. The reference intake air amount is corrected with a ratio between an air density under a current condition of a current atmospheric pressure, a current intake air temperature and a current gauge pressure and an air density under the reference condition to calculate an intake air amount for the current condition.

Because the current intake air amount is calculated by using a ratio between an air density for the reference condition and an air density for the current condition, a more accurate intake air amount is obtained even at high altitude. Further, the current intake air amount is obtained with fewer settings. Providing the intake air amount under the reference condition is required, but providing the intake air amount under other various conditions is not required. Because the gauge pressure, which is a differential pressure of the intake manifold pressure with respect to the atmospheric pressure, is used (absolute pressure is not used), a more accurate intake air amount is obtained without decreasing the internal EGR amount and the like.

According to one embodiment of the invention, a fuel injection amount is determined based on the intake air amount thus calculated. Because the intake air amount is obtained more accurately and with fewer settings as described above, a fuel injection amount is also obtained more accurately and with fewer settings.

According to one embodiment of the invention, when a control for maintaining a gauge pressure of the intake manifold constant is performed, a requested intake air amount is corrected with a ratio between an air density under a current condition of a current atmospheric pressure, a current intake air temperature and a current gauge pressure and an air density under the reference condition to calculate a reference intake air amount for the reference condition. The intake air amount map corresponding to the gauge pressure thus maintained constant is referred to based on a current rotational speed, a current phase and the calculated reference intake air amount, to determine a lift amount of the intake valve. The intake valve is controlled in accordance with the lift amount thus determined.

Because a desired lift amount is determined by using a ratio between an air density for the reference condition and an air density for the current condition, a more accurate desired lift amount is obtained even at high altitude. Further, the desired lift amount is obtained with fewer settings. Providing the intake air amount under the reference condition is required, but providing the intake air amount under other various conditions is not required. Because a gauge pressure, which is a differential pressure of the intake manifold pressure with respect to the atmospheric pressure, is used (absolute pressure is not used), a more accurate desired lift amount is obtained without decreasing the internal EGR amount and the like.

According to another aspect of the present invention, a variable valve mechanism for controlling an intake air amount by adjusting a lift amount and a phase of an intake valve of an engine is mounted on the engine. An ignition timing map indicating a correlation among a rotational speed, a gauge pressure of an intake manifold, a lift amount of the intake valve, a phase of the intake valve and an ignition timing of the engine under a reference condition of a predetermined reference atmospheric pressure is provided. The ignition timing map is referred to based on a current rotational speed, a current gauge pressure of the intake manifold, a current lift amount of the intake valve and a current phase of the intake valve to determine, as a reference ignition timing, an ignition timing for the reference condition. A correction amount map indicating a correlation among an atmospheric pressure, a rotational speed, a gauge pressure and an ignition timing correction amount is referred to based on a current atmospheric pressure, the current rotational speed and the current gauge pressure to determine an ignition timing correction amount. The reference ignition timing is corrected with the ignition timing correction amount to determine an ignition timing.

Thus, an ignition timing is obtained by referring to the ignition timing map under the reference condition and correcting the reference ignition timing with the ignition timing correction amount. Providing the ignition timing under the reference condition is required, but providing the ignition timing under other various conditions is not needed. Because the ignition timing adapted to the current atmospheric pressure is obtained by correcting the ignition timing for the reference condition with the ignition timing correction amount corresponding to the atmospheric pressure, a more appropriate ignition timing is determined independently of whether the vehicle is at high altitude. Furthermore, because a gauge pressure, which is a differential pressure of the intake manifold pressure with respect to the atmospheric pressure, is used (absolute pressure is not used), a more accurate ignition timing is obtained without decreasing the internal EGR amount and the like.

DESCRIPTION OF THE PREFERRED EMBODIMENTS

Figure 1:
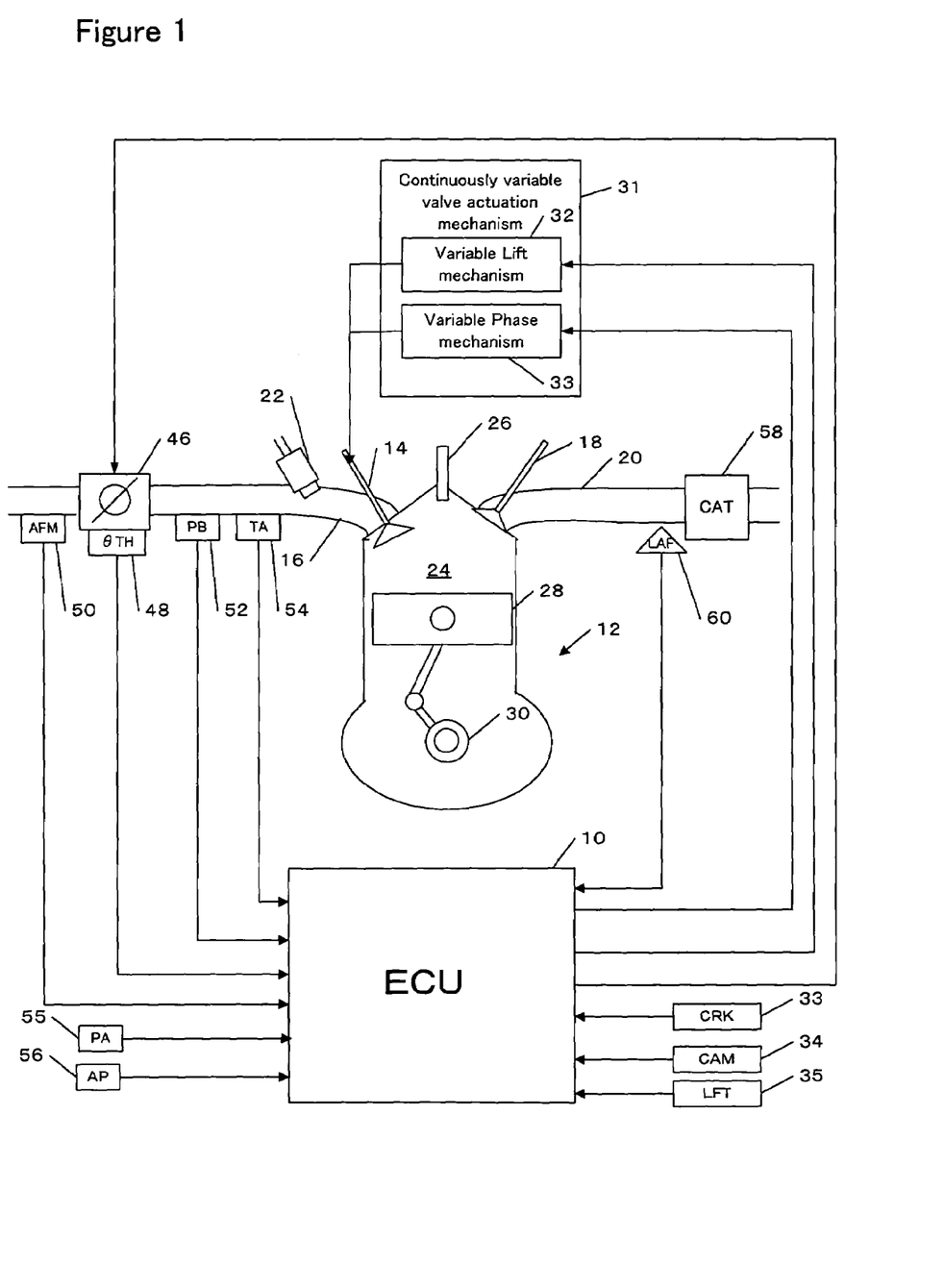
FIG. 1 is a block diagram showing an overall structure of an engine and its control unit in accordance with one embodiment of the present invention.

Preferred embodiments of the present invention will be described referring to the attached drawings. FIG. 1 is an overall system structure of an engine and its control unit in accordance with one embodiment of the present invention.

An electronic control unit (hereinafter referred to as an "ECU") 10 is a computer having an input/output interface, a central processing unit (CPU) and a memory. One or more programs for implementing various controls for the vehicle and data required for executing the programs may be stored in the memory. One or more programs for controls according to the invention, data and one or more maps used for executing the programs may be also stored in the memory. The ECU 10 receives data sent from each part of the vehicle via the input/output interface, carries out operations to generate control signals, and sends out the control signals for controlling each part of the vehicle.

An engine 12 is, for example, a 4-cycle engine equipped with four cylinders. One of the cylinders is schematically illustrated in FIG. 1. The engine 12 is connected to an intake manifold 16 through an intake valve 14 and connected to an exhaust manifold 20 through an exhaust valve 18. A fuel injection valve 22 for injecting fuel in accordance with a control signal from the ECU 10 is provided in the intake manifold 16. Alternatively, the fuel injection valve 22 may be provided in a combustion chamber 24.

The engine 12 introduces an air-fuel mixture of the air taken from the intake manifold 16 and the fuel injected from the fuel injection valve 22 into the combustion chamber 24. A spark plug 26 is provided in the combustion chamber 24 to ignite the spark in accordance with an ignition timing signal from the ECU 10. The air-fuel mixture combusts in response to the spark ignited by the spark plug 26. The combustion increases the volume of the air-fuel mixture to push a piston 28 downward. A reciprocal motion of the piston 28 is converted into a rotational motion of a crank shaft 30. In the case of a 4-cycle engine, a cycle of the engine includes four strokes of intake, compression, combustion and exhaust. The piston 28 travels up and down four times in one cycle.

A continuously variable valve actuation mechanism 31 is a mechanism capable of continuously changing a lift amount and an opening/closing timing (phase) of the intake valve 14. In this embodiment, the continuously variable valve actuation mechanism 31 includes a variable lift mechanism 32 and a variable phase mechanism 33.

The variable lift mechanism 32 is a mechanism capable of continuously changing the lift amount of the intake valve 14 in accordance with a control signal from the ECU 10. The variable lift mechanism can be implemented by any known technique. For example, a mechanism implemented with a cam, lift variable link, upper link, and lower link has been proposed (Japanese Patent Application Publication No. 2004-036560). In the mechanism, the angle of the lower link is changed by, for example, an actuator to control a maximum lift amount of the valve.

The variable phase mechanism 33 is a mechanism capable of continuously changing the opening/closing timing (phase) of the intake valve 14 in accordance with a control signal from the ECU 10. The variable phase mechanism can be implemented by any known technique. For example, a mechanism for electromagnetically advancing and retarding the phase of the intake valve has been proposed (Japanese Patent Application Publication No. 2000-227033).

Alternatively, the variable lift mechanism 32 and the variable phase mechanism 33 may be integrated into a single unit. The present invention is not limited to these mechanisms that are capable of continuously changing the lift amount and the phase. The present invention is applicable to a mechanism capable of changing the lift amount and the phase in a step-by-step manner.

In this embodiment, the continuously variable valve actuation mechanism 31 is utilized for controlling the amount of intake air introduced into the engine 12. The intake air amount can be controlled by changing the lift amount and/or the phase of the intake valve 14 via the continuously variable valve actuation mechanism 31.

A crank angle sensor 33 for detecting a rotation angle of the crank shaft 30 and a cam angle sensor 34 for detecting a rotation angle of a cam shaft to which a cam for driving an intake valve 14 of the engine 12 is connected are connected to the ECU 10. Detection values of these sensors are provided to the ECU 10. The crank angle sensor 33 issues one pulse (CRK pulse) at every predetermined crank angle (for example, 30 degrees). In response to the pulse, the rotation angle position of the crank shaft 30 can be identified. The cam angle sensor 34 issues a pulse (CYL pulse) at a predetermined crank angle position for a particular cylinder of the engine and a pulse (TDC pulse) at the top dead center (TDC) at the beginning of the intake stroke of each cylinder. These pulses are used for detecting an engine rotational speed NE and various control timings such as a fuel injection timing and an ignition timing.

An actual phase CAIN of the cam shaft is detected from a relative relation between the TDC pulse issued from the cam angle sensor 34 and the CRK pulse issued from the crank angle sensor 33. At the most retarded phase, the value of CAIN is set to zero. As the phase is advanced, the value of CAIN is larger.

A lift amount sensor 35 for detecting a lift amount LIFT of the intake valve 14 is provided in the continuously variable valve actuation mechanism 31. The sensor 37 is connected to the ECU 10. The lift amount sensor 35 may be implemented by any known technique. For example, the sensor 35 may be implemented with a potentiometer. A detection value of the sensor 35 is sent to the ECU 10.

A throttle valve 46 is provided in the intake manifold 16. The throttle valve 46 is a drive-by-wire (DBW) throttle valve that is driven by an actuator (not illustrated in the drawings) in accordance with a control signal from the ECU 10.

A throttle valve opening sensor 48, which is attached to the throttle valve 46, provides the ECU 10 with a signal corresponding to an opening degree TH of the throttle valve.

In this embodiment, the throttle valve 46 is provided for controlling a gauge pressure in the intake manifold 16. The gauge pressure in the intake manifold can be adjusted by changing the opening degree of the throttle valve 46.

An air flow meter 50 is provided upstream of the throttle valve 46 of the intake manifold 16. The air flow meter 50 outputs to the ECU 10 an electric signal indicating the amount of intake air GAIR.

An intake manifold pressure sensor 52 and an intake air temperature sensor 54 are provided downstream of the throttle valve 46 of the intake manifold 16 to output to the ECU 10 electric signals indicating an absolute pressure PB inside the intake manifold and a temperature TA of intake air, respectively. An atmospheric pressure sensor 55 is provided at an appropriate position outside the engine to output to the ECU 10 an electric signal indicating an atmospheric pressure PA. The ECU 10 calculates a gauge pressure PBGA of the intake manifold based on the intake manifold absolute pressure PB and the atmospheric pressure PA. The gauge pressure PBGA indicates a differential pressure of the intake manifold absolute pressure with respect to the atmospheric pressure and is represented by "PA-PB (mmHg)" in this embodiment.

An accelerator pedal sensor 56 for detecting an opening degree AP of an accelerator pedal is connected to the ECU 10. The ECU 10 can determine a requested intake air amount based on the accelerator pedal opening degree.

A LAF (linear air-fuel) sensor 60 is provided upstream of a catalyst 58 of the exhaust manifold 20. The LAF sensor 60 outputs to the ECU 10 a signal that is proportional to the concentration of oxygen included in the exhaust gas over a wide range from lean to rich.

Figure 2:
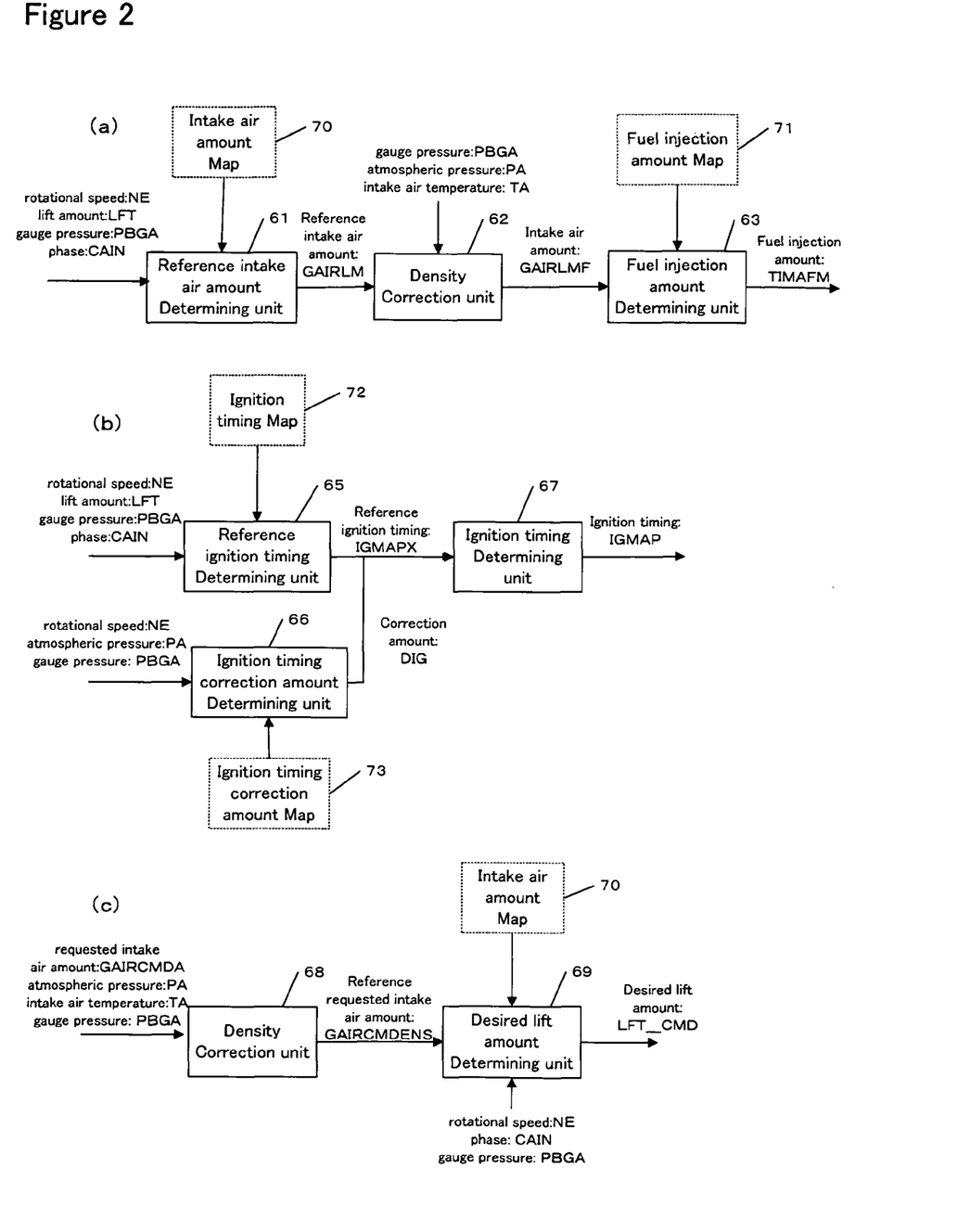
FIG. 2 shows a functional block diagram of a control apparatus in accordance with one embodiment of the present invention.

Referring to FIG. 2, a control apparatus of an engine in accordance with one embodiment of the present invention will be described. The control apparatus may be implemented in the ECU 10 of FIG. 1 and configured to implement control forms as shown in FIGS. 2(a), 2(b) and 2(c). Each function of the control apparatus may be implemented by the CPU of the ECU 10. The CPU of the ECU 10 performs one or more programs stored in the memory of the ECU 10 to implement each function. Each of these control forms will be described below.

FIG. 2(a) shows functional blocks for determining an intake air amount from a current operating condition of the engine and controlling a fuel injection amount based on the determined intake air amount.

The control apparatus stores an intake air amount map 70 in the memory. The map indicates a correlation among the engine rotational speed, the lift amount of the intake valve, the gauge pressure of the intake manifold, the phase of the intake valve and the intake air amount under a predetermined reference condition. The reference condition indicates a condition of a predetermined reference atmospheric pressure PA_STD and a predetermined reference intake air temperature TA_STD. In this embodiment, the reference atmospheric pressure is 760 mmHg (101.32 kPa) and the reference intake air temperature is 298 K (25 degrees). However, the reference condition is not limited to these values. In another embodiment, the reference atmospheric pressure and the reference intake air temperature may be set to other values.

A reference intake air amount determining unit 61 receives the rotational speed NE, the lift amount LFT of the intake valve, the phase CAIN of the intake valve and the gauge pressure PBGA which are detected by the corresponding sensors under the current operating condition as described above, and refers to the intake air amount map 70 based on these parameters so as to determine a corresponding intake air amount GAIRLM. The intake air amount thus determined represents an intake air amount for the reference condition and is referred to as a reference intake air amount.

A density correction unit 62 corrects the reference intake air amount GAIRLM with a ratio $K\rho$ between an air density $\rho$ base for the reference condition of the reference atmospheric pressure PA_STD and the reference intake air temperature TA_STD and an air density $\rho$ for the current condition of the current atmospheric pressure PA and the current intake air temperature TA, to calculate an intake air amount GAIRLMF for the current condition. More specifically, the air density ratio $K\rho$ is represented based on the gas equation (PV=nRT), which is known, as shown in the equation (1). The intake air amount GAIRLMF is calculated by multiplying the reference intake air amount GAIRLM by the density ratio $K\rho$ as shown in the equation (2). Thus, the intake air amount under the reference condition is converted into the intake air amount under the current condition. It should be noted that TA_STD is 298 K and PA_STD is 760 mmHg in this embodiment as described above. The intake air temperature TA in the equations is expressed in units of K (kelvin). The atmospheric pressure PA and the gauge pressure PBGA are expressed in units of mmHg.

$$K\rho = \frac{\rho}{\rho base} = \frac{PA + PBGA}{TA} \times \frac{TA\_STD}{PA\_STD + PBGA} \quad (1)$$

$$GAIRLMF = GAIRLM \times K\rho \quad (2)$$
$$= GAIRLM \times \frac{PA + PBGA}{PA\_STD + PBGA} \times \frac{TA\_STD}{TA}$$

Because the air density at high altitude is smaller than the air density at low altitude, the actual intake air amount (mass flow amount) at high altitude is smaller than the actual intake air amount at low altitude for the same volume of air. By performing the air density correction as described above, the actual intake air amount can be calculated more accurately at any place of different air densities. Even at high altitude, the intake air amount based on the air density of high altitude can be calculated through the above density correction.

Furthermore, according to the above-described technique, the intake air amount can be determined with fewer steps of referring to the intake air amount map and performing the correction equation shown by the equation (2). Although a map that defines the intake air amount under the reference condition is required, maps that define the intake air amount under other conditions of other atmospheric pressures and other intake air temperatures are not required. The intake air amount for other conditions of other atmospheric pressures and other intake temperatures can be determined by converting the intake air amount for the reference condition through the correction equation (2). Therefore, the amount of data to be stored is reduced.

A fuel injection amount determining unit 63 refers to a fuel injection amount map 71, which is stored in the memory of the ECU 10, based on the intake air amount GAIRLMF thus determined so as to determine a fuel injection amount TIMAFM. The ECU 10 controls the fuel injection valve 22 (FIG. 1) such that the amount of fuel corresponding to the determined fuel injection amount TIMAFM is injected.

It should be noted that the intake air amount GAIRLMF may be used not only for the determination of the fuel injection amount but also for various other controls of the engine (for example, air/fuel ratio control).

FIG. 2(b) shows functional blocks for controlling the ignition timing. The control apparatus stores an ignition timing map 72 in the memory. The map indicates a correlation among the engine rotational speed, the lift amount of the intake valve, the gauge pressure of the intake manifold, the phase of the intake valve and the ignition timing under a predetermined reference condition. The reference condition indicates a condition of a predetermined reference atmospheric pressure PA_STD. In this embodiment, the reference atmospheric pressure is 760 mmHg (101.32 kPa). However, the reference condition is not limited to this value. In another embodiment, the reference atmospheric pressure may be set to another value.

A reference ignition timing determining unit 65 receives the rotational speed NE, the lift amount LFT of the intake valve, the phase CAIN of the intake valve and the gauge pressure PBGA which are detected by the corresponding sensors under the current operating condition as described above, and refers to the ignition timing map 72 based on these parameters so as to determine a corresponding ignition timing IGMAPX. The ignition timing thus determined represents an ignition timing for the reference condition and is referred to as a reference ignition timing.

An ignition timing correction amount map 73 is also stored in the memory. This map indicates a correlation among the rotational speed, the atmospheric pressure, the gauge pressure and an ignition timing correction amount.

An ignition timing correction amount determining unit 66 receives the rotational speed NE, the atmospheric pressure PA and the gauge pressure PBGA which are detected by the corresponding sensors under the current operating condition as described above and refers to the ignition timing correction amount map 73 based on these parameters so as to determine a corresponding ignition timing correction amount DIG. Thus, the ignition timing correction amount corresponding to the atmospheric pressure is determined.

An ignition timing determining unit 67 adds the ignition timing correction amount DIG to the reference ignition timing IGMAPX to calculate an ignition timing IGMAP as an optimum ignition timing (MBT). The ECU 10 controls the spark plug 26 (FIG. 1) such that ignition is performed in accordance with the determined ignition timing IGMAP.

Balance between the intake air pressure and the exhaust gas pressure may change depending on a change in the atmospheric pressure, which may cause a change in the charging efficiency of the engine. As a result, the optimum ignition timing (MBT) may vary. According to the above-described technique, such variations due to a change in the atmospheric pressure can be compensated for.

FIG. 2(c) shows functional blocks for controlling a desired lift amount of the intake valve based on the current operating condition of the engine when a constant negative pressure control for maintaining the gauge pressure constant independently of a change in the atmospheric pressure is performed. The constant negative pressure can be implemented by controlling the opening degree of the throttle valve 46 (FIG. 1).

The control form of FIG. 2(c) may be regarded as the reverse of the control form of FIG. 2(a). A density correction unit 68 corrects a requested intake air amount GAIRCMDA with a ratio K'ρ between an air density ρ base for the reference condition of the reference atmospheric pressure PA_STD and the reference intake air temperature TA_STD and an air density ρ for the current condition of the current atmospheric pressure PA and the current intake air temperature TA to calculate an intake air amount GAIRCMDENS for the reference condition. The requested intake air amount GAIRCMDA may be determined by the ECU 10 according to any appropriate technique. For example, the requested intake air amount GAIRCMDA may be determined based on the opening degree of the accelerator pedal detected by the accelerator pedal sensor 56 (FIG. 1).

The density correction in this control may be regarded as a conversion in the reverse direction of FIG. 2(a), that is, regarded as a conversion from the current condition to the reference condition. As shown in the equation (3) the density ratio K'ρ used in this correction process is the reciprocal of the density ratio Kρ used in FIG. 2(a). The requested intake air amount GAIRCMDENS for the reference condition (which is referred to as a reference requested intake air amount) is calculated by multiplying the requested intake air amount GAIRCMDA by the density ratio K'ρ as shown in the equation (4). Thus, the requested intake air amount for the current condition is converted to the requested intake air amount for the reference condition. It should be noted that TA_STD is 298 K and PA_STD is 760 mmHg in this embodiment as described above. The intake air temperature TA in the equations is expressed in units of K (kelvin). The atmospheric pressure PA and the gauge pressure PBGA are expressed in units of mmHg.

$$K'\rho = \frac{\rho base}{\rho} = \frac{PA\_STD + PBGA}{TA\_STD} \times \frac{TA}{PA + PBGA} \quad (3)$$

$$\begin{aligned} GAIRCMDENS &= GAIRCMDA \times K'\rho \\ &= GAIRCMDA \times \frac{PA\_STD + PBGA}{PA + PBGA} \times \frac{TA}{TA\_STD} \end{aligned} \quad (4)$$

As described above referring to the control form of FIG. 2(a), the intake air amount map 70 is stored in the memory. The map indicates a correlation among the engine rotational speed, the lift amount, the gauge pressure, the phase and the intake air amount under the above-described reference condition. In the case of FIG. 2(a), the map is referred to based on the current lift amount to determine the corresponding intake air amount. In contrast, in the control form of FIG. 2(c), a desired lift amount determining unit 69 receives the engine rotational speed NE, the phase CAIN of the intake valve and the gauge pressure PBGA (which is controlled to be constant), which are detected by the corresponding sensors under the current operating condition, together with the reference requested intake air amount GAIRCMDENS, and refers to the intake air amount map 70 based on these parameters so as to determine a corresponding lift amount as a desired lift amount LFT_CMD.

Because the air density at high altitude is smaller than the air density at low altitude, the air volume actually required for the engine at high altitude is larger than the air volume actually required for the engine at low altitude. By performing the air density correction as described above, the desired lift amount can be calculated more accurately at any place of different air densities. Even at high altitude, the desired lift amount based on the air density of high altitude can be calculated through the above density correction.

Furthermore, according to the above-described technique, the desired lift amount can be determined with fewer steps of referring to the intake air amount map and performing the correction equation shown by the equation (4). Although a map that defines the lift amount under the reference condition is required, maps that define the lift amount under other conditions of other atmospheric pressures and other intake air temperatures are not required. The lift amount for other conditions of other atmospheric pressures and other intake temperatures can be determined by converting the requested intake air amount for the reference condition through the correction equation (4). Therefore, the amount of data to be stored is reduced.

The ECU 10 controls the variable lift mechanism 32 (FIG. 1) such that a lift amount corresponding to the desired lift amount thus determined is implemented.

Referring to FIG. 3 through FIG. 10, control flows in accordance with one embodiment of the present invention will be described. These control flows may be performed at predetermined time intervals by the CPU of the ECU 10.

Figure 3:
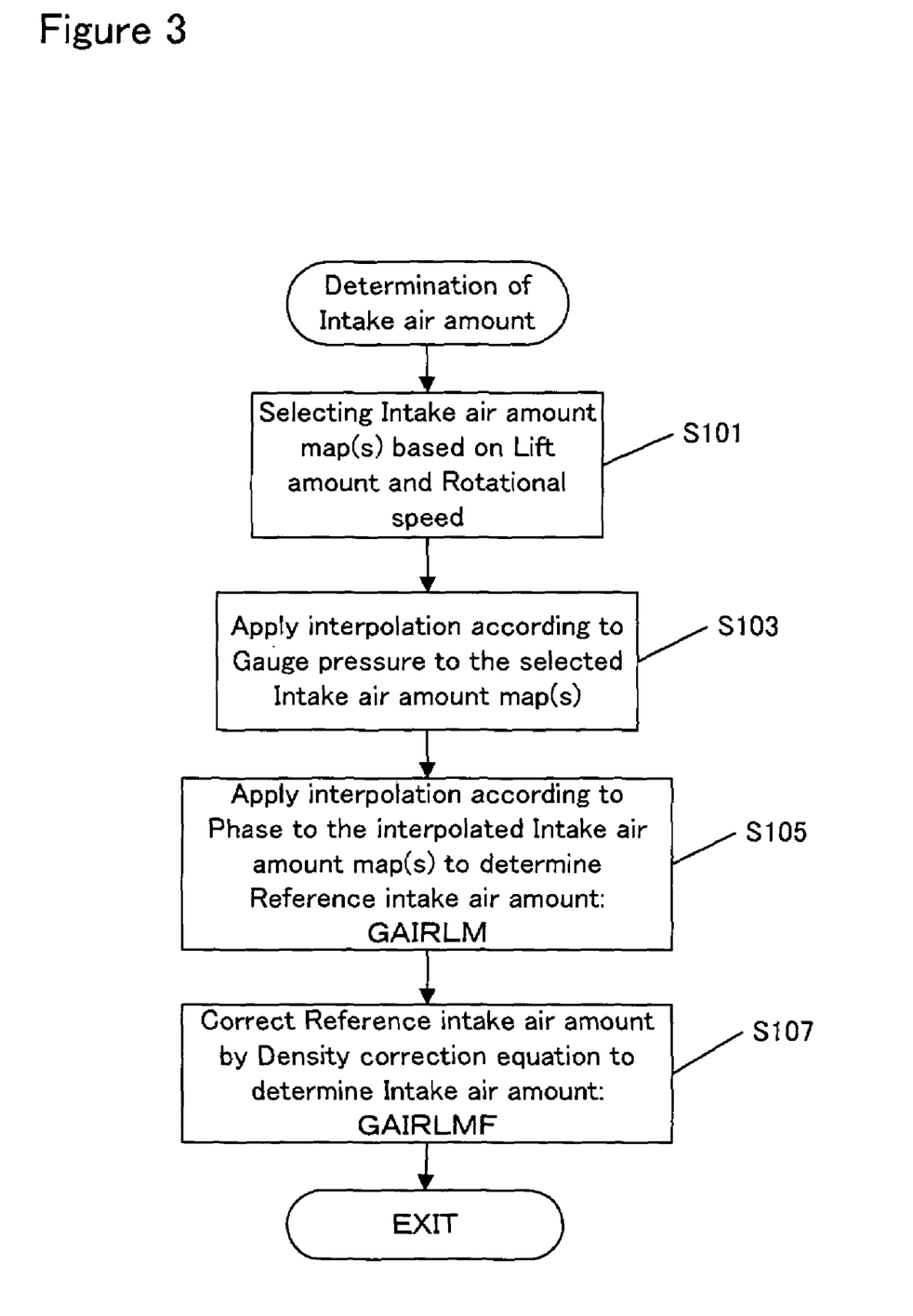
FIG. 3 is a flowchart of a process for determining an intake air amount in accordance with one embodiment of the present invention.

FIG. 3 is a flowchart of a process for determining the intake air amount in accordance with the control form in FIG. 2(*a*). The process may be performed by the reference intake air amount determining unit 61 and the density correction unit 62.

In this embodiment, the intake air amount map 70 actually includes a plurality of maps each of which corresponds to each of a plurality of values of the gauge pressure. In each of these maps, intake air amount values are defined corresponding to engine rotational speed values and lift amount values. In this embodiment, three values are used for the gauge pressure. In step S101, three intake air amount maps provided corresponding to the first to third gauge pressure values, respectively, are selected based on the detected lift amount LFT and the detected engine rotational speed NE.

Figure 4:
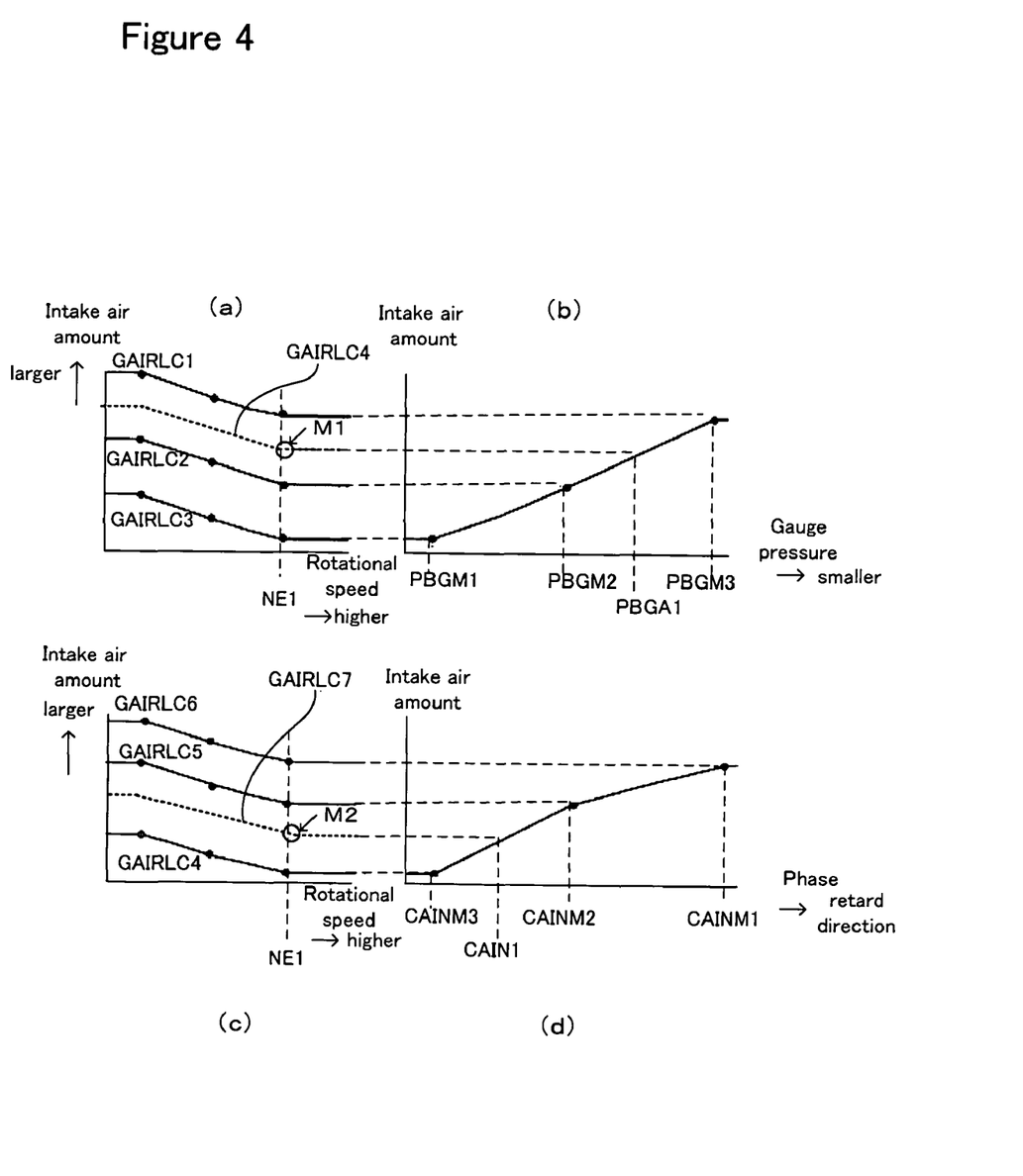
FIG. 4 schematically shows intake air amount maps in accordance with one embodiment of the present invention.

FIG. 4(*a*) shows, as an example, three intake air amount maps GAIRLC1, GAIRLC2 and GAIRLC3 corresponding to the detected lift amount. These three maps are provided corresponding to the first, second and third gauge pressure values PBGM1, PBGM2 and PBGM3, respectively, as shown in FIG. 4(*b*). The intake air amount (which is expressed per one cycle) decreases with an increase of the rotational speed. The intake air amount increases with a decrease of the magnitude (absolute value) of the gauge pressure.

In step S103, an interpolation calculation is applied to the maps GAIRLC1 to GAIRLC3 in accordance with the detected gauge pressure PBGA. Referring to FIG. 4(*b*), if the detected gauge pressure PBGA is, for example, PBGA1, it is located between the second gauge pressure PBGM2 and the third gauge pressure PBGM3. Accordingly, a map GAIRLC4 corresponding to the gauge pressure PBGA1 is obtained as shown by the dashed line. If the detected rotational speed NE is NE1, a map value M1 is obtained.

Furthermore, the three intake air amount maps are provided corresponding to each of a plurality of phase values. More specifically, in the example in FIG. 4(*a*), a set of maps GAIRLC1 to GAIRLC3 are provided corresponding to each of the first, second and third phase values CAINM1 to CAINM3.

Accordingly, step S103 is performed for each of the first to third phase values. If the above-referenced map GAIRLC4 is for the third phase CAINM3 for example, maps GAIRLC5 and GAIRLC6 are similarly obtained for the second and the first phase values CAINM2 and CAINM1, respectively.

In step S105, an interpolation calculation is applied to the maps GAIRLC4 to GAIRLC6 in accordance with the detected phase CAIN. FIG. 4(*c*) shows an example of GAIRLC4 to GAIRLC6, each of which corresponds to the first to third phase values CAINM1 to CAINM3, respectively. As the phase is retarded, an overlap between the intake valve and the exhaust valve is smaller, which increases the intake air amount.

If the detected phase CAIN is, for example, CAIN1, it is located between the third phase value CAINM3 and the second phase value CAINM2. Accordingly, a map GAIRLC7 corresponding to the phase CAIN1 is obtained as shown by the dashed line. If the detected rotational speed NE is NE1, a map value M2 is obtained. This map value M2 represents the reference intake air amount GAIRLM.

In step S107, the density correction is performed upon the reference intake air amount GAIRLM according to the above-described equation (2) so as to calculate the intake air amount GAIRLMF.

It should be noted that the maps such as GAIRLC1 of FIG. 4(*a*) may be configured such that only several intake air amount values corresponding to several rotational speed values are defined. In this case, the intake air amount value corresponding to the detected rotational speed NE can be determined by an interpolation calculation. For example, in the map of GAIRLC1, only the intake air amount values as indicated by black dots may be defined. An intake air amount value located between one black dot and another black dot is calculated through the interpolation calculation. This will be similarly applied to the maps which will be described below.

Figure 5:
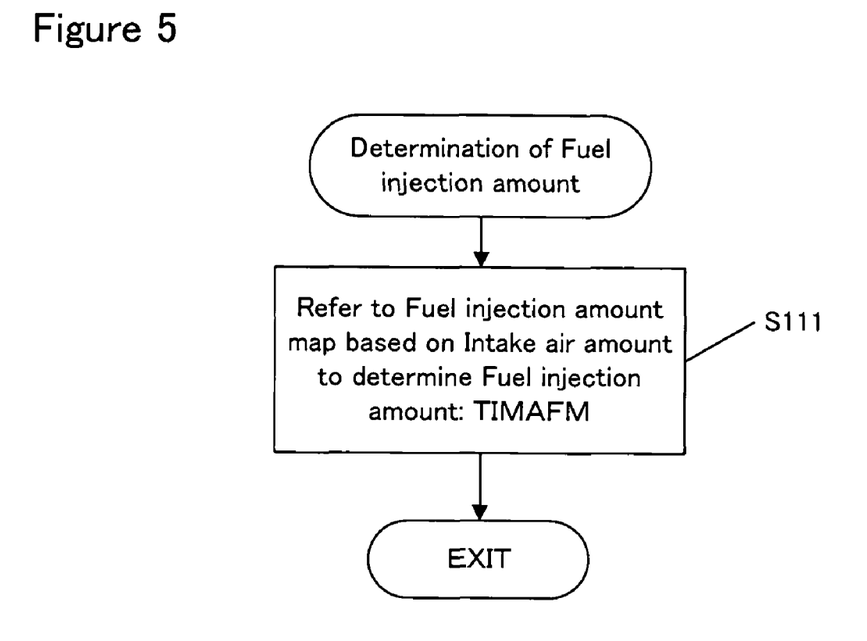
FIG. 5 is a flowchart of a process for determining a fuel injection amount in accordance with one embodiment of the present invention.

FIG. 5 is a flowchart of a process for determining the fuel injection amount in accordance with the control form in FIG. 2(*a*). The process may be performed by the fuel injection amount determining unit 63.

Figure 6:
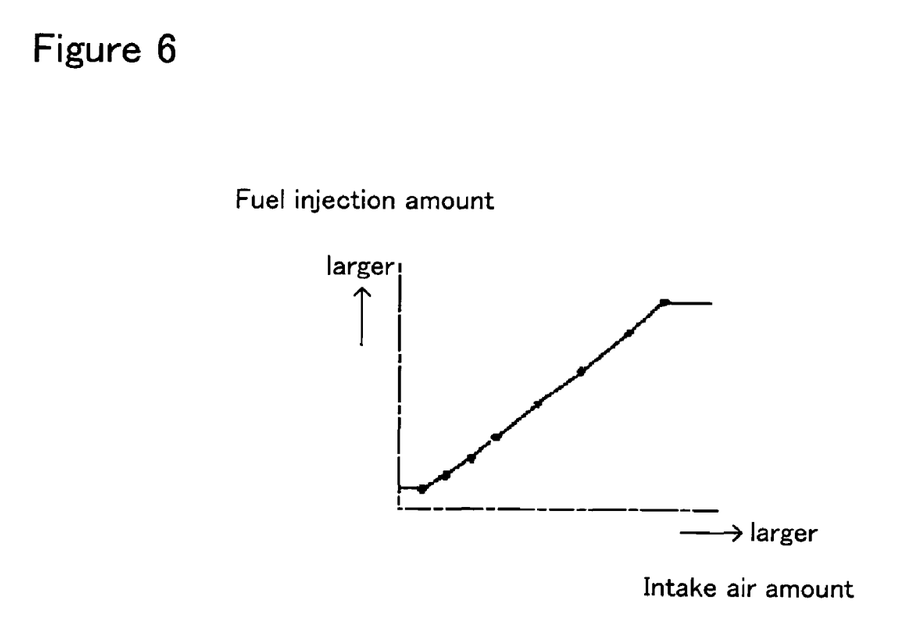
FIG. 6 schematically shows a fuel injection amount map in accordance with one embodiment of the present invention.

In step S111, a fuel injection amount is determined by referring to a fuel injection amount map based on the intake air amount GAIRLMF determined in step S107 of FIG. 3. An example of the map is shown in FIG. 6, which is based on a desired air/fuel ratio (for example, the stoichiometric air/fuel ratio). The fuel injection amount increases with an increase of the intake air amount.

Figure 7:
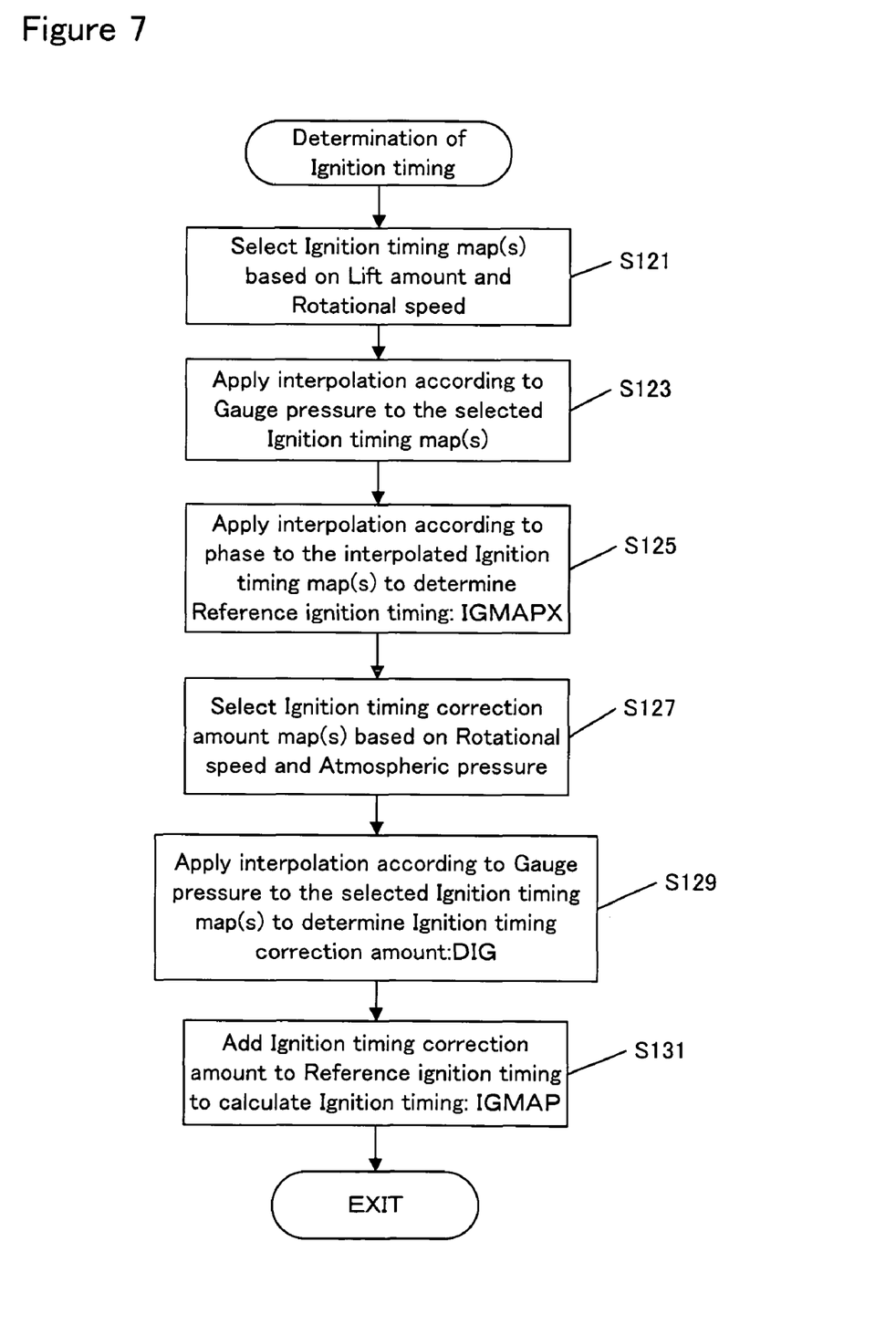
FIG. 7 is a flowchart of a process for determining an ignition timing in accordance with one embodiment of the present invention.
Figure 8:
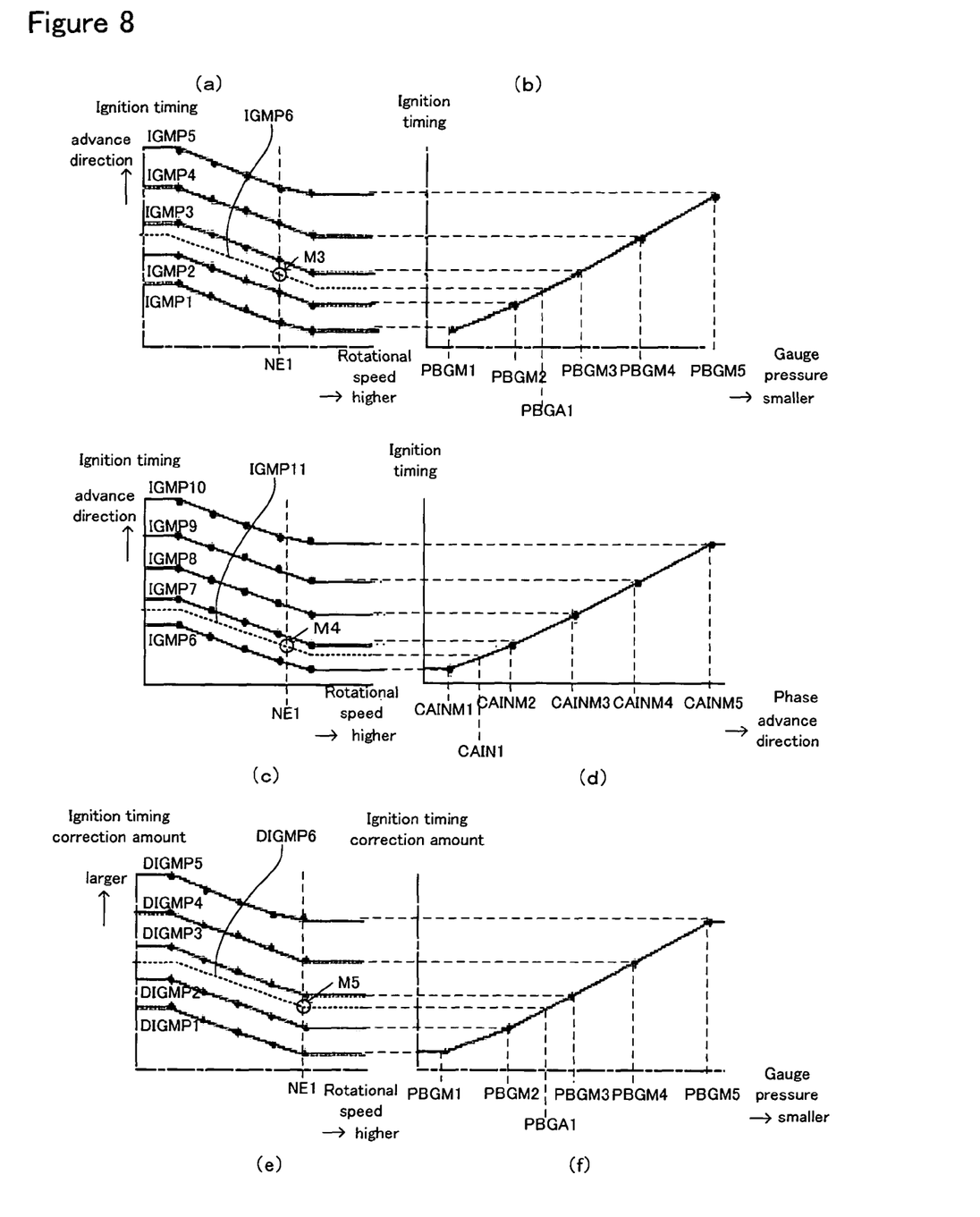
FIG. 8 schematically shows ignition timing maps and ignition timing correction amount maps in accordance with one embodiment of the present invention.

FIG. 7 is a flowchart of a process for determining the ignition timing in accordance with the control form in FIG. 2(*b*). The process may be performed by the reference ignition timing determining unit 65, the ignition timing correction amount determining unit 66 and the ignition timing determining unit 67.

In this embodiment, the ignition timing map 72 actually includes a plurality of maps each of which corresponds to each of a plurality of values of the gauge pressure. In each of these maps, ignition timing values are defined corresponding to engine rotational speed values and lift amount values. In this embodiment, five values are used for the gauge pressure. In step S121, five ignition timing maps provided corresponding to the first to fifth gauge pressures, respectively, are selected based on the detected lift amount of the intake valve and the detected rotational speed.

FIG. 8(a) shows, as an example, five ignition timing maps IGMP1 to IGMP5 corresponding to the detected lift amount. These five maps are provided corresponding to the first to fifth gauge pressure values PBGM1 to PBGM5, respectively, as shown in FIG. 8(b). In this embodiment, the ignition timing is retarded with an increase of the rotational speed. The ignition timing is advanced with a decrease of the magnitude (absolute value) of the gauge pressure. It should be noted that these maps are only one example. The direction and amount in and by which the ignition timing is controlled may be determined by any appropriate technique. For example, such direction and amount may be changed in accordance with the engine operating condition and/or the control form.

In step S123, an interpolation calculation is applied to the maps IGMP1 to IGMP5 in accordance with the detected gauge pressure PBGA. Referring to FIG. 8(b), if the detected gauge pressure PBGA is, for example, PBGA1, it is located between the second gauge pressure PBGM2 and the third gauge pressure PBGM3. Accordingly, a map IGMP6 corresponding to the gauge pressure PBGA1 is obtained as shown by the dashed line. If the detected rotational speed NE is NE1, a map value M3 is obtained.

Furthermore, the five ignition timing maps are provided corresponding to each of a plurality of phase values. More specifically, in the example in FIG. 8(a), a set of maps IGMP1 to IGMP5 are provided corresponding to each of the first to fifth phase values CAINM1 to CAINM5.

Accordingly, step S123 is performed for each of the first to fifth phase values. If the above-referenced map IGMP6 is for the first phase value CAINM1 for example, maps IGMP7 to IGMP10 are similarly obtained for the second to fifth phase values CAINM2 to CAINM5, respectively.

In step S125, an interpolation calculation is applied to the maps IGMP6 to IGMP10 in accordance with the detected phase CAIN of the intake valve. FIG. 8(c) shows an example of IGMP6 to IGMP10, each of which corresponds to the first to fifth phases CAINM1 to CAINM5, respectively. As the phase is advanced, the ignition timing is advanced.

For example, if the detected phase CAIN is CAIN1, it is located between the first phase CAINM1 and the second phase CAINM2. Accordingly, a map IGMP11 corresponding to the phase CAIN1 is obtained as shown by the dashed line. If the detected rotational speed NE is NE1, a map value M4 is obtained. This map value M4 represents the reference ignition timing IGMAPX.

In this embodiment, the ignition timing correction amount map 73 actually includes a plurality of maps each of which corresponds to each of a plurality of values of the gauge pressure. In each of these maps, ignition timing correction amount map values are defined corresponding to engine rotational speed values and the atmospheric pressure values. In this embodiment, five values are used for the gauge pressure. In step S127, five ignition timing correction amount maps which are provided corresponding to the first to fifth gauge pressure values are selected based on the detected engine rotational speed and the detected atmospheric pressure.

FIG. 8(e) shows, as an example, five ignition timing correction amount maps DIGMP1 to DIGMP5 corresponding to the detected atmospheric pressure. These five maps are provided corresponding to the first to fifth gauge pressure values PBGM1 to PBGM5, respectively, as shown in FIG. 8(f). The correction amount for correcting the ignition timing decreases with an increase of the rotational speed. The correction amount increases with a decrease of the magnitude (absolute value) of the gauge pressure.

In step S129, an interpolation calculation is applied to the maps DIGMP1 to DIGMP5 in accordance with the detected gauge pressure PBGA. Referring to FIG. 8(f), if the detected gauge pressure PBGA is, for example, PBGA1, it is located between the second gauge pressure value PBGM2 and the third gauge pressure value PBGM3. Accordingly, a map DIGMP6 corresponding to the gauge pressure PBGA1 is obtained as shown by the dashed line. If the detected rotational speed NE is NE1, a map value M5 is obtained. This map value M5 represents the ignition timing correction amount.

In step S131, the ignition timing correction amount DIG obtained in step S129 is added to the reference ignition timing IGMAPX obtained in step S125 so as to calculate the ignition timing IGMAP.

Figure 9:
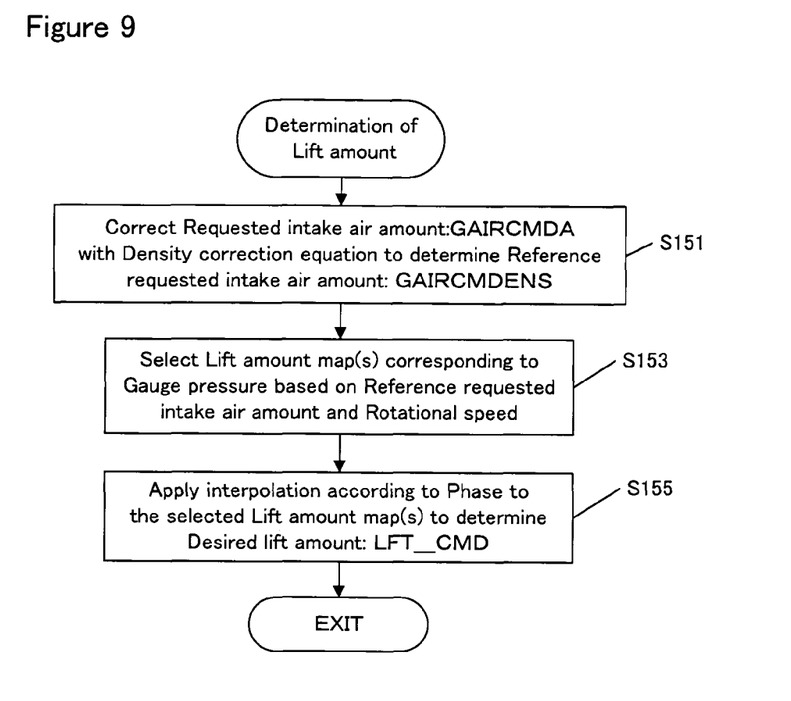
FIG. 9 is a flowchart of a process for determining a desired lift amount in accordance with one embodiment of the present invention.

FIG. 9 is a flowchart of a process for determining the desired lift amount in accordance with the embodiment in FIG. 2(c). The process may be performed by the density correction unit 68 and the desired lift amount determining unit 69.

In step S151, the density correction is performed upon the requested intake air amount GAIRCMDA according to the above-described equation (4) to calculate the reference requested intake air amount GAIRCMDENS.

The intake air amount map 70 as described above referring to FIG. 4 can be similarly used in this process. As described above, the intake air amount map 70 actually includes a plurality of maps each of which corresponds to each of a plurality of values of the gauge pressure. In each of these maps, intake air amount values are defined corresponding to engine rotational speed values and lift amount values. In other words, there are a plurality of maps each of which corresponds to each of a plurality of values of the gauge pressure, and in each of these maps, lift amount values are defined corresponding to the engine rotational speed values and the intake air amount values. That is, in the process shown in FIG. 4, the detected lift amount is used as a key for searching the intake air amount from the intake air amount map 70. In contrast, in this process, the calculated reference requested intake air amount is used as a key for searching the lift amount (the map is referred to in the reverse direction to FIG. 4).

As described above, the gauge pressure is predetermined because this control form is based on the constant negative pressure control for maintaining the gauge pressure constant. Therefore, in step S153, based on the reference requested intake air amount and the rotational speed, maps corresponding to the gauge pressure that is controlled to a constant value (these maps are referred to as lift amount maps) are selected from the plurality of intake air maps that are respectively provided corresponding to the plurality of gauge pressure values.

Figure 10:
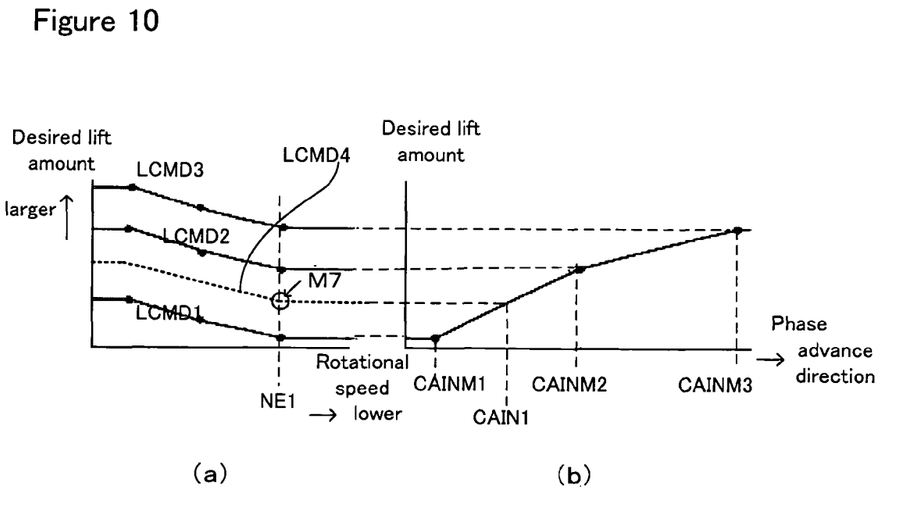
FIG. 10 schematically shows lift amount maps in accordance with one embodiment of the present invention.

Furthermore, as described above referring to FIG. 4, the selected lift amount maps are provided corresponding to each of the plurality of phase values. FIG. 10 shows, as an example, the lift amount maps LCMD1 to LCMD3 that are selected in step 153. These maps correspond to the first to third phase values CAINM1 to CAINM3, respectively. The desired lift amount increases with an increase of the rotational speed. As the phase is advanced, the desired lift amount is larger.

In step S155, an interpolation calculation is applied to the lift amount maps LCMD1 to LCMD3 in accordance with the detected phase CAIN of the intake valve. If the detected phase CAIN is, for example, CAIN1, it is located between the first phase value CAINM1 and the second phase value CAINM2. Accordingly, a map LCMD4 corresponding to the phase CAIN1 is obtained as shown by the dashed line. If the detected rotational speed NE is NE1, a map value M7 is obtained. This map value M7 represents the desired lift amount LFT_CMD.

It should be noted that the maps that have been described above are only examples and the present invention is not limited to those maps. For example, the number of the values for the gauge pressure and the phase is three in the maps of FIG. 4, the number of the values for the gauge pressure and the phase is five in the maps of FIG. 8, and the number of the values for the phase is three in the maps of FIG. 10. However, the number of values is not limited to such specific values.

Although some embodiments of the present invention have been described above, the present invention is not limited to those embodiments and also those embodiments can be modified as long as the modification remains within the scope of the present invention.

What is claimed is:

1. A control apparatus for an internal-combustion engine having a variable valve actuation mechanism for controlling an intake air amount by adjusting a lift amount and a phase of an intake valve of the engine, the apparatus comprising:
    a storage for storing an intake air amount map indicating a correlation among a rotational speed, a gauge pressure of an intake manifold, a lift amount of the intake valve, a phase of the intake valve and an intake air amount of the engine under a reference condition of a predetermined reference atmospheric pressure and a predetermined reference intake air temperature; and
    a control unit configured to:
    determine an intake air amount for the reference condition as a reference intake air amount by referring to the intake air amount map based on a current rotational speed, a current gauge pressure of the intake manifold, a current lift amount of the intake valve and a current phase of the intake valve; and
    correct the reference intake air amount with a ratio between an air density under a current condition of a current atmospheric pressure, a current intake air temperature and a current gauge pressure and an air density under the reference condition to calculate an intake air amount for the current condition.

2. The control apparatus of claim 1, wherein the control unit is further configured to determine a fuel injection amount based on the intake air amount thus calculated.

3. The control apparatus of claim 1, wherein the control unit is further configured to:
    when a control for maintaining a gauge pressure of the intake manifold constant is performed, correct a requested intake air amount with a ratio between an air density under a current condition of a current atmospheric pressure, a current intake air temperature and a current gauge pressure and an air density under the reference condition to calculate a reference intake air amount for the reference condition;
    determine a lift amount of the intake valve by, based on a current rotational speed, a current phase and the calculated reference intake air amount, referring to the intake air amount map corresponding to the gauge pressure that is controlled to be constant; and
    control the intake valve in accordance with the determined lift amount of the intake valve.

4. A method for an internal-combustion engine having a variable valve actuation mechanism for controlling an intake air amount by adjusting a lift amount and a phase of an intake valve of the engine, the method comprising:
    defining an intake air amount map indicating a correlation among a rotational speed, a gauge pressure of an intake manifold, a lift amount of the intake valve, a phase of the intake valve and an intake air amount of the engine under a reference condition of a predetermined reference atmospheric pressure and a predetermined reference intake air temperature;
    determining an intake air amount for the reference condition as a reference intake air amount by referring to the intake air amount map based on a current rotational speed, a current gauge pressure of the intake manifold, a current lift amount of the intake valve and a current phase of the intake valve; and
    correcting the reference intake air amount with a ratio between an air density under a current condition of a current atmospheric pressure, a current intake air temperature and a current gauge pressure and an air density under the reference condition to calculate an intake air amount for the current condition.

5. The method of claim 4, further comprising determining a fuel injection amount based on the intake air amount thus calculated.

6. The method of claim 4, further comprising:
    when a control for maintaining a gauge pressure of the intake manifold constant is performed, correcting a requested intake air amount with a ratio between an air density under a current condition of a current atmospheric pressure, a current intake air temperature and a current gauge pressure and an air density under the reference condition to calculate a reference intake air amount for the reference condition;
    determining a lift amount of the intake valve by, based on a current rotational speed, a current phase and the calculated reference intake air amount, referring to the intake air amount map corresponding to the gauge pressure that is controlled to be constant; and
    controlling the intake valve in accordance with the determined lift amount of the intake valve.

7. A computer program embodied on a computer readable medium for controlling an intake air of an internal combustion engine having a variable valve actuation mechanism for controlling an intake air amount by adjusting a lift amount and a phase of an intake valve of the engine, the medium storing an intake air amount map indicating a correlation among a rotational speed, a gauge pressure of an intake manifold, a lift amount of the intake valve, a phase of the intake valve and an intake air amount of the engine under a reference condition of a predetermined reference atmospheric pressure and a predetermined reference intake air temperature, comprising the steps of:
    determining an intake air amount for the reference condition as a reference intake air amount by referring to the intake air amount map based on a current rotational speed, a current gauge pressure of the intake manifold, a current lift amount of the intake valve and a current phase of the intake valve; and
    correcting the reference intake air amount with a ratio between an air density under a current condition of a current atmospheric pressure, a current intake air temperature and a current gauge pressure and an air density under the reference condition to calculate an intake air amount for the current condition.

8. The computer program of claim 7, further comprising determining a fuel injection amount based on the intake air amount thus calculated.

9. The computer program of claim 7, further comprising:
when a control for maintaining a gauge pressure of the intake manifold constant is performed, correcting a requested intake air amount with a ratio between an air density under a current condition of a current atmospheric pressure, a current intake air temperature and a current gauge pressure and an air density under the reference condition to calculate a reference intake air amount for the reference condition;

determining a lift amount of the intake valve by, based on a current rotational speed, a current phase and the calculated reference intake air amount, referring to the intake air amount map corresponding to the gauge pressure that is controlled to be constant; and controlling the intake valve in accordance with the determined lift amount of the intake valve.

* * * * *